(12) United States Patent
Tanikawa et al.

(10) Patent No.: US 6,291,771 B1
(45) Date of Patent: Sep. 18, 2001

(54) STRUCTURE AND METHOD FOR CONNECTING COVERED WIRES

(75) Inventors: Satoshi Tanikawa; Nobuyuki Asakura, both of Shizuoka-ken (JP)

(73) Assignee: Yazaki Corporation, Tokyo (JP)

( * ) Notice: Subject to any disclaimer, the term of this patent is extended or adjusted under 35 U.S.C. 154(b) by 0 days.

(21) Appl. No.: 09/274,382

(22) Filed: Mar. 23, 1999

(30) Foreign Application Priority Data

Mar. 25, 1998 (JP) .................................................. 10-077835

(51) Int. Cl.⁷ ........................................................ H01R 4/00
(52) U.S. Cl. .............................. 174/84 R; 29/872; 174/78
(58) Field of Search ................................. 174/84 R, 94 R, 174/84 C, 74 R, 78; 29/872, 868

(56) References Cited

U.S. PATENT DOCUMENTS

| | | | |
|---|---|---|---|
| 2,250,156 | * 7/1941 | Ferguson | 219/10 |
| 3,244,798 | * 4/1966 | Warner | 174/84 |
| 4,878,969 | * 11/1989 | Janisch | 156/49 |
| 5,584,122 | * 12/1996 | Kato et al. | 29/872 |
| 5,922,993 | * 7/1999 | Ide et al. | 174/84 R |
| 5,925,202 | * 7/1999 | Ide et al. | 156/73.2 |
| 5,929,384 | * 7/1999 | Ide et al. | 174/84 R |
| 5,959,252 | * 9/1999 | Ide et al. | 174/84 |
| 6,004,170 | * 12/1999 | Kato et al. | 439/874 |
| 6,072,124 | * 6/2000 | Kato et al. | 174/84 R |

FOREIGN PATENT DOCUMENTS

| | | |
|---|---|---|
| 0 834 956 A2 | 9/1997 | (EP) . |
| 0 834 956 | * 4/1998 | (EP) . |
| 7-320842 | 12/1995 | (JP) . |
| 8-78071 | 3/1996 | (JP) . |

\* cited by examiner

*Primary Examiner*—Dean A. Reichard
*Assistant Examiner*—William H. Mayo, III
(74) *Attorney, Agent, or Firm*—Finnegan, Henderson, Farabow, Garrett & Dunner, L.L.P.

(57) ABSTRACT

A connecting structure includes a shield wire 1, a ground wire 2, an upper resin tip 15, a lower resin tip 16, and a low-melting welding material 17. First, the ground wire 2 is overlaid on the shield wire 1 in cross. Next, overlapping portions of the shield wire 1 and the ground wire 2 are interposed between the resin tips 15 and 16. By oscillating the resin tips 15 and 16 with ultrasonic waves, respective outside rinds 1d, 2d of the wires 1,2 are removed in the vicinity of the overlapping portions. A braided wire 1c of the wire 1 is electrically connected with a core line 2a of the wire 2 and, simultaneously, the resin tips 15 and 16 are welded to each other to seal up the vicinity of a connecting part S1. With the ultrasonic oscillation, a low-melting materials 17 is molten to flow into the connecting part S1, so that the braided wire 1c of the wire 1 is joined to the core line 2a of the wire 2 through the molten material 17.

8 Claims, 6 Drawing Sheets

STRUCTURE AND METHOD FOR CONNECTING COVERED WIRES

BACKGROUND OF THE INVENTION

1. Field of the Invention

The present invention relates to a structure and method for connecting covered wires, by which respective conductors of the covered wires can be connected to each other by making use of internal heating of the wires brought by ultrasonic oscillation. More particularly, it relates to a connecting method for covered wires, which is effective to connect a shield wire with a ground wire.

2. Description of the Related Art

Generally, it is complicated and troublesome to handle a shield wire having a braided wire coaxially disposed around a core line (or core lines) with the deteriorated workability in using the shield wire. As an effective measure for improving the deteriorated workability, there is provided a connecting structure for wires which takes advantage of inside heating due to the ultrasonic oscillation by Japanese Unexamined Patent Publication (kokai) No. 7-320842.

In the publication, there are shown two kinds of covered wires. One is a shield wire which comprises a core line, an inside insulating rind arranged outside the core line, a braided wire as a shield conductor arranged outside the inside insulating rind, and an outside insulating rind. The other is a ground wire consisting of a core line and an outside resinous rind arranged outside the core line.

According to the disclosed method, in order to connect the braided wire of the shield wire with the core line of the ground wire in front of the connector, the shield wire and the ground wire being both connected to a connector, the ground wire is firstly overlaid on the shield wire so as to cross each other at a connection point. Next, the overlapping portions are interposed between upper and lower resin tips. Then, while compressing the upper and lower resin tips from the outside, they are subjected to ultrasonic oscillation by making use of an ultrasonic horn and an anvil. Consequently, both of the outside rinds of the shield wire and the ground wire are molten for elimination, so that the braided wire of the shield wire comes into electrical contact with the core line of the ground wire. Simultaneously, the upper and lower resin tips are mutually welded to each other thereby to seal up the surroundings of the above connecting point.

In this way, according to the above publication, there has been provided the connecting structure where the braided wire of the shield wire and the core line of the ground wire are connected to overlap each other.

Besides the electrical connection between the shield wire and the ground wire, there is disclosed another connecting structure where covered wires are electrically connected by making use of internal heating produced by the ultrasonic oscillation in Japanese Unexamined Patent Publication (kokai) No. 8-78071.

In the disclosed connecting method, two different covered wires are firstly overlapped so as to cross each other. Next, so-obtained overlapping portions of the wires are disposed between an upper resin tip and a lower resin tip and subsequently, the upper and lower resin tips are subjected to the ultrasonic oscillation under pressure from the outside. Consequently, respective outside rinds of the covered wires are molten and removed from the circumference of the overlapping portions, so that both core lines of the wires can be electrically connected to each other. Simultaneously, the upper and lower resin tips are welded into one body, thereby to seal up the circumference of a connection of the core lines.

In common with the above-mentioned publications, however, since the conductors of the covered wires, i.e. the braided wire, the core lines, etc. are simply overlapped and contacted with each other in the integrated and closed resin tips, the resultant connecting structure does easily exhibit dispersion in terms of contact area between the conductors (between the braided and the core line, between the core line and the core line). In other words, the earlier art connecting methods have problems of dispersion in electrical performance at the connection between the conductors.

SUMMARY OF THE INVENTION

Under such a circumstance, it is therefore an object of the present invention to provide structure and method for connecting covered wires, by which it is possible to reduce the dispersion in conductive area, thereby accomplishing the reliable conductivity of the connection between the conductors.

The object of the present invention described above can be accomplished by a connecting structure for covered wires, comprising:

a first covered wire having a first conductor covered with an insulating cover;

a second covered wire having a second conductor covered with another insulating cover, the second cover being overlaid on the first covered wire so as to cross thereto;

upper and lower resin tips welded to each other so as to interpose overlapping portions of the first and second wires therebetween; and a welding material being positioned in the upper and lower resin tips welded into one body;

wherein the insulating covers of the first and second wires are locally removed at the overlapping portions of the first and second wires so that the first conductor of the first covered wire comes into electrical contact with the second conductor of the second covered wire, thereby providing a connecting part of the first and second wires; and wherein the welding material is molten into the connecting part, while the welded upper and lower resin tips seal up the circumference of the connecting part.

According to the connecting structure, since the welding material is molten into the connecting part of the conductors of the first and second covered wires, the conductors are joined to each other through the molten welding material metallically and there is no possibility of producing dispersion in conductive area between the conductors. Consequently, it is possible to obtain the reliable conductivity between the first and second covered wires while also restricting the dispersion in electrical performance of the connecting part.

In the present invention, preferably, the upper and lower resin tips are provided, on their faces butting each other, with wire accommodating grooves of semi-circular cross sections, each of which has a diameter substantially equal to the diameter of the first covered wire.

With this establishment of the diameter, it is possible to weld the upper and lower resin tips in the form of wrapping the insulating cover of the first covered wire without compressing it strongly.

In the present invention, preferably, the first covered wire is a shield wire having a shield conductor as the first conductor, while the second covered wire is a ground wire having a core line as the second conductor.

In detail, since the shield conductor and the core line are joined to each other through the molten welding material metallically, there is no possibility of producing dispersion in conductive area between the shield conductor and the core line. Consequently, it is possible to obtain the reliable conductivity between the shield wire and the ground wire while also restricting the dispersion in electrical performance of the connecting part.

In the present invention, more preferably, the wire accommodation groove of the upper resin tip is provided with a recess for accommodating the welding material therein.

In this case, when the welding material is molten by the ultrasonic oscillation, much material would remain in the welded resin tips due to the provision of the recess. Thus, it is possible to increase the conductive area between the first and second covered wires, providing the improvement in electrical performance at the connecting part. Additionally, there is no possibility of leakage of the molten material between the upper and lower resin tips.

In connection with the above modification, alternatively, the welding material may be arranged in the recess so that a top of the welding material projects from an inner face defining the wire accommodation groove of the upper resin tip.

In this case, in comparison with the above modification, it is possible to ensure a relatively large amount of welding material between the first and second covered wires. Therefore, it is also possible to make sure of the conductive area between the conductors of the first and second covered wires more widely, whereby the electrical performance can be improved, furthermore.

According to the present invention, there is also provided a method for connecting covered wires to each other, the method comprising: the steps of:

preparing a first covered wire having a first conductor covered with an insulating cover and a second covered wire having a second conductor covered with another insulating cover;

overlaying the second covered wire on the first covered wire so as to cross each other;

putting overlapping portions of the first and second wires between an upper resin tip and a lower resin tip; and oscillating the upper and lower resin tips with ultrasonic waves while pressurizing the upper and lower resin tips from the outside, whereby the insulating covers of the first and second covered wires are locally molten and removed in the vicinity of the overlapping portions thereby to allow the first conductor of the first covered wire to contact with the second conductor of the second covered wire, and whereby the upper and lower resin tips are mutually welded into one body thereby to seal up the circumference of the contact between the first conductor and the second conductor with the welded resin tips;

wherein, before oscillating the upper and lower resin tips with ultrasonic wave, a welding material is interposed at least either between the overlapping portions of the first and second covered wires or between the upper resin tip and the second covered wire.

According to the above method, the welding material is molten due to the internal heating action by the ultrasonic oscillation. Thus, the first and second conductors are joined to each other through the molten welding material metallically. Consequently, it is possible to increase the conductive area between the first and second covered wires, providing the improvement in electrical performance at the connecting part.

In the above-mentioned method, preferably, the upper and lower resin tips are provided, on their faces butting each other, with wire accommodating grooves of semi-circular cross sections, each of which has a diameter substantially equal to the diameter of the first covered wire, and the wire accommodation groove of the upper resin tip is provided with a recess for accommodating the welding material therein. Additionally, it is preferable that the overlapping portions of the first and second covered wires are put between the upper resin tip and the lower resin tip on condition that the welding material is accommodated in the recess in advance.

Also in this preferable method, the welding material is molten due to the internal heating action by the ultrasonic oscillation and flows into the connecting part of the conductors. Consequently, it is possible to increase the conductive area between the first and second covered wires, providing the improvement in electrical performance at the connecting part. Furthermore, there is no possibility of leakage of the molten material between the upper and lower resin tips.

In connection with the above method, alternatively, the welding material may be arranged in the recess so that a top of the welding material projects from an inner face defining the wire accommodation groove of the upper resin tip.

In this case, in comparison with the above method, it is possible to increase the amount of welding material flowing into the connecting part. Thus, it is also possible to increase the conductive area between the conductors of the first and second covered wires, providing the improvement in electrical performance of the connecting part.

These and other objects and features of the present invention will become more fully apparent from the following description and appended claims taken in conjunction with the accompany drawings.

BRIEF DESCRIPTION OF THE DRAWINGS

FIGS. 1A and 1B are views showing a connecting structure obtained in accordance with a first embodiment of the present invention.

FIGS. 3A and 3B are views respectively showing a resin tip in accordance with a second embodiment of the present invention.

FIGS. 7A and 7B are views respectively showing a resin tip in accordance with a third embodiment of the present invention.

DESCRIPTION OF THE PREFERRED EMBODIMENT

U.S. Pat. No. 5,584,122, Kato et al, issued on Dec. 17, 1996 is characterized by reference herein in its entirety. Embodiments of the present invention will be described with reference to the accompanying drawings.

The connecting structures and methods of the embodiments are characterized by oscillating an object with ultrasonic waves while interposing a low-melting welding material between upper and lower resin tips.

[1st. Embodiment]

Figure 1A:
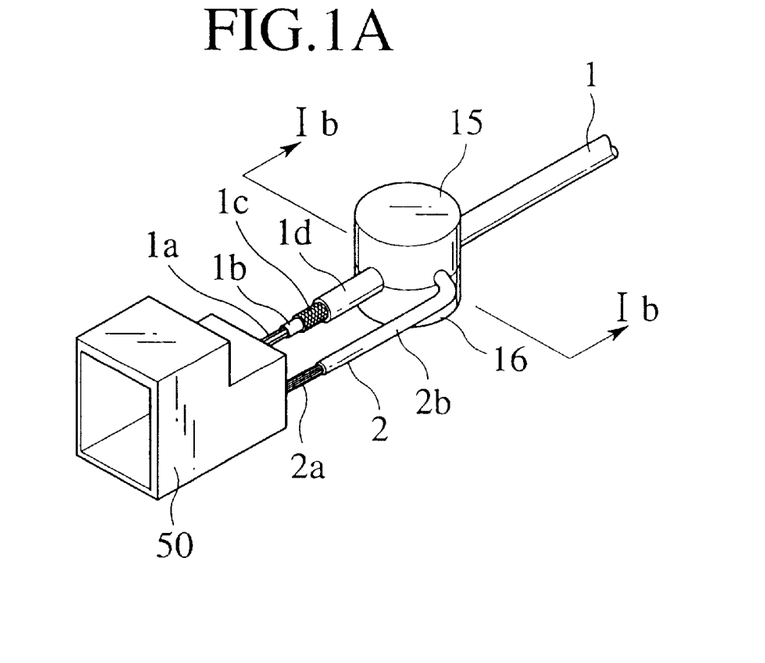
FIG. 1A is a perspective view of the connecting structure and FIG. 1B is a cross sectional view taken along a line of Ib—Ib of FIG. 1A.
Figure 1B:
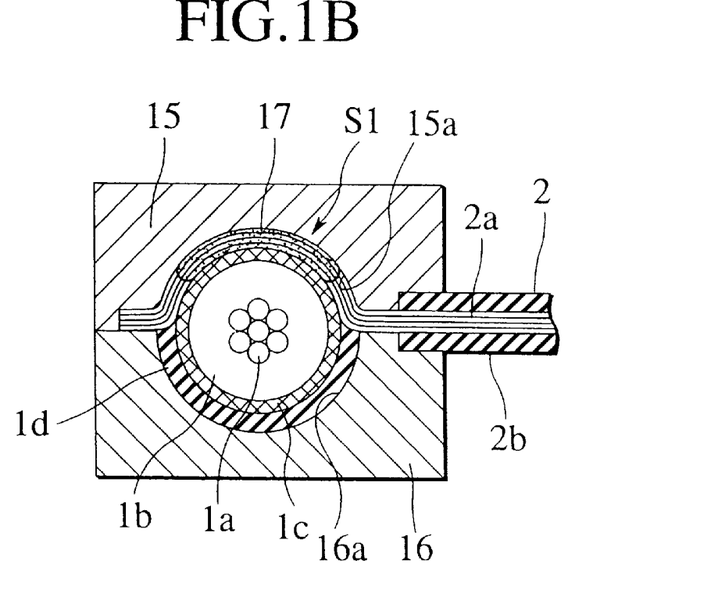

FIGS. 1A and 1B show a connecting structure provided by the connecting method of the first embodiment. In the figures, FIG. 1A shows the overall configuration of the connecting structure, while FIG. 1B shows the detailed structure between an upper resin tip 15 and a lower resin tip 16. In the shown connecting structure, a "low-melting" welding material 17 of a relatively low melting point, such as the solder and the brazing metal, is molten in a contact of both conductors of a shield wire (first covered wire) 1 and a ground wire (second covered wire) 2, that is, a connecting part S1 between a braided wire 1c and a core line 2a. The low-melting welding material 17 flows among stitches of the braided wire 1c and also flows among the core line 2a, thereby joining the braided wire 1c to the core line 2a metallically.

Note, the resin tips 15, 16 of the embodiment are respectively provided with wire accommodation grooves 15a, 16a of semicircular cross sections, each of which has a diameter corresponding to a diameter of the shield wire 1.

Figure 2:
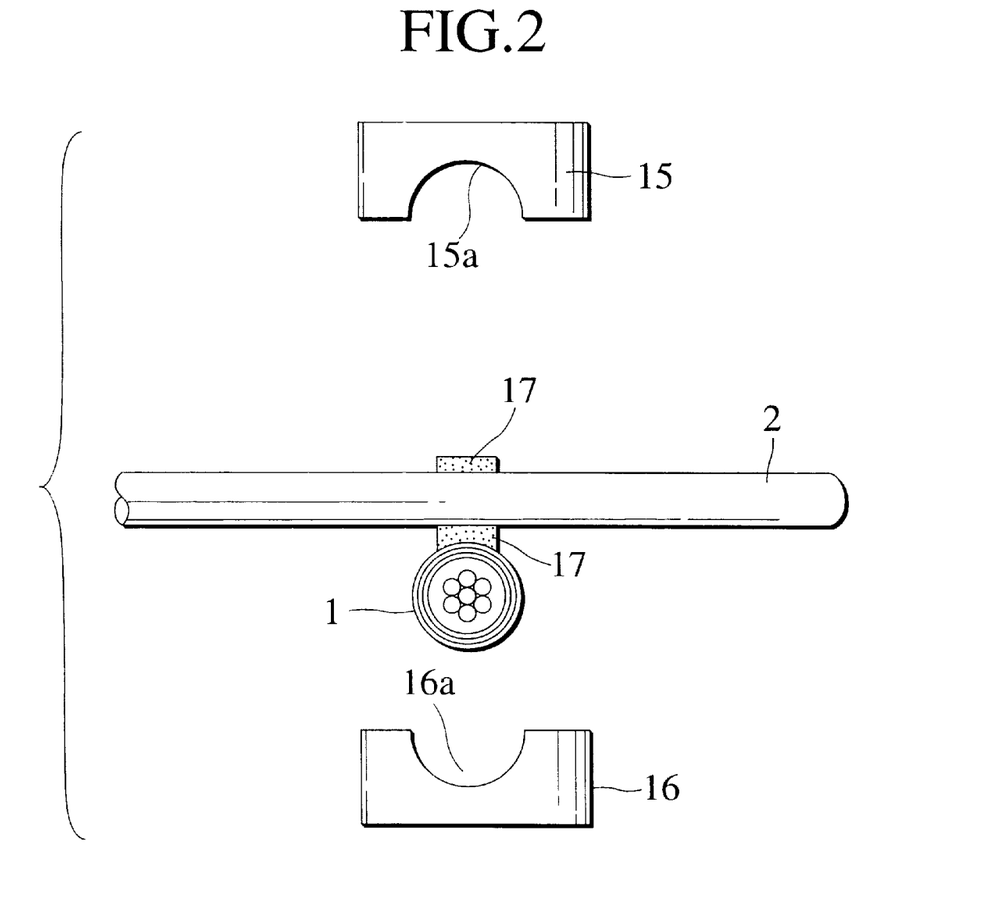
FIG. 2 is a side view showing a connecting method in accordance with the first embodiment of the present invention.

In order to connect the shield wire 1 with the ground wire 2, the latter is firstly overlaid on the former so as to cross each other at the connecting part S1. Next, both overlapping portions of the shield wire 1 and the ground wire 2 are interposed between the upper resin tip 15 and the lower resin tip 16. At this time, as shown in FIG. 2, the low-melting welding material (pieces) 17, 17 are arranged between the ground wire 1 and the shield wire 1 and between the upper resin tip 15 and the ground wire 2, respectively. In this state, while compressing the upper and lower resin tips 15, 16 from the outside, they are subjected to the ultrasonic oscillation by using an (ultrasonic horn 7 and an anvil 8.) Consequently, an outside rind 1d of the shield wire 1 and an outside rind 2b of the ground wire 2 are together molten and removed from the vicinity of the connecting part S1, so that the braided wire 1c of the shield wire 1 comes into electrical contact with the core line 2a of the ground wire 2. Simultaneously, the upper and lower resin tips 15, 16 are mutually welded to each other, for sealing up the surroundings of the connecting part S1.

Further, owing to the internal heating action generated between the resin tips 15, 16 by the ultrasonic oscillation, the low-melting welding pieces 17, 17 are molten to flow among the stitches of the braided wire 1c and also among the core line 2a, so that the braided wire 1c is joined to the core line 2a through the welding material 17, metallically. In this way, the shield wire 1 is connected with the ground wire 2, as shown in FIGS. 1 and 2.

According to the connecting structure, since the braided wire 1c of the shield wire 1 and the core line 2a of the ground wire 2 are joined to each other through the molten low-melting welding material 17 metallically, there is no possibility of dispersion in conductive area between the conductors of the wires 1, 2. Consequently, it is possible to obtain the reliable conductivity between the shield wire 1 and the ground wire 2 while also restricting the dispersion in electrical performance of the connecting part S1.

In the following table 1, there are shown an inter-connection resistance of the connecting part S1 after thermal-shock test, in both cases of using the low-melting welding material 17 and not using it. Note, in this test, the thermal-shock test has been completed by repeating to leaving the connecting part S1 under the atmosphere of +120° C. for one hour and the atmosphere of –40° C. for one hour, by ten times.

From the table 1, it will be understood that a reduction of inter-connection resistance without using the material 17 is large in comparison with that of inter-connection resistance with using the material 17. Furthermore, as obvious from the table 1, the inter-connection resistance in case of using the material 17 is smaller than that in case of not-using it.

TABLE 1

Inter-Connection Resistance after Thermal shock Test (mΩ)

|  | Initial stage | After endurance test |
| --- | --- | --- |
| No use of low-melting metal | 4.52 | 97.03 |
| Use of low-melting metal | 1.06 | 12.72 |

Additionally, owing to the provision of the wire accommodating grooves 15a, 16a in accordance with the embodiment, it is possible to prevent the low-melting welding material 17 from leaking to a direction crossing the axial direction of the shield wire 1.

[2nd. Embodiment]

Figure 3A:
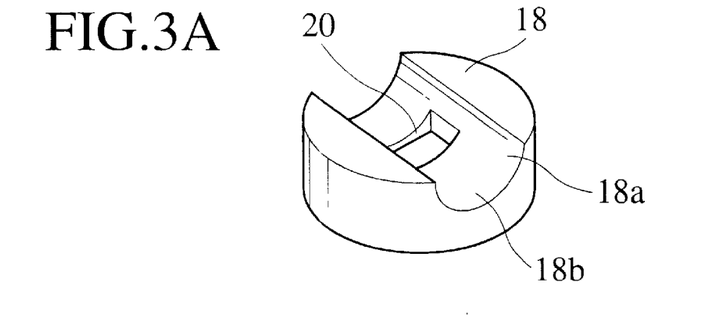
FIG. 3A is a perspective view of the upper resin tip provided with an accommodation recess and FIG. 3B is a perspective view showing a condition of accommodating a low-melting brazing material in the accommodation recess.
Figure 3B:
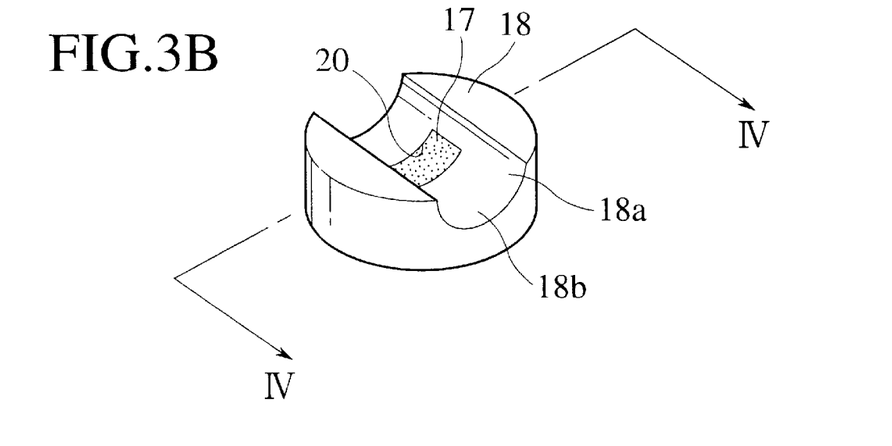
Figure 4:
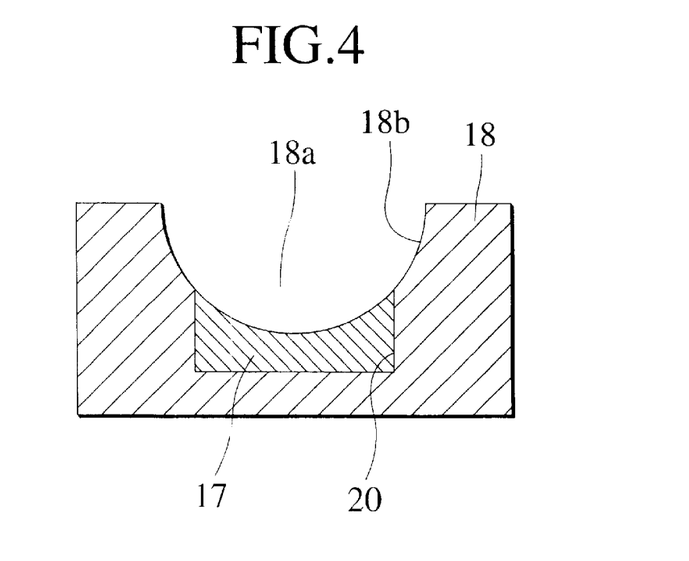
FIG. 4 is a cross sectional view taken along a line of IV—IV of FIG. 3, showing a condition that the low-melting brazing material is accommodated in the accommodation recess.
Figure 5:
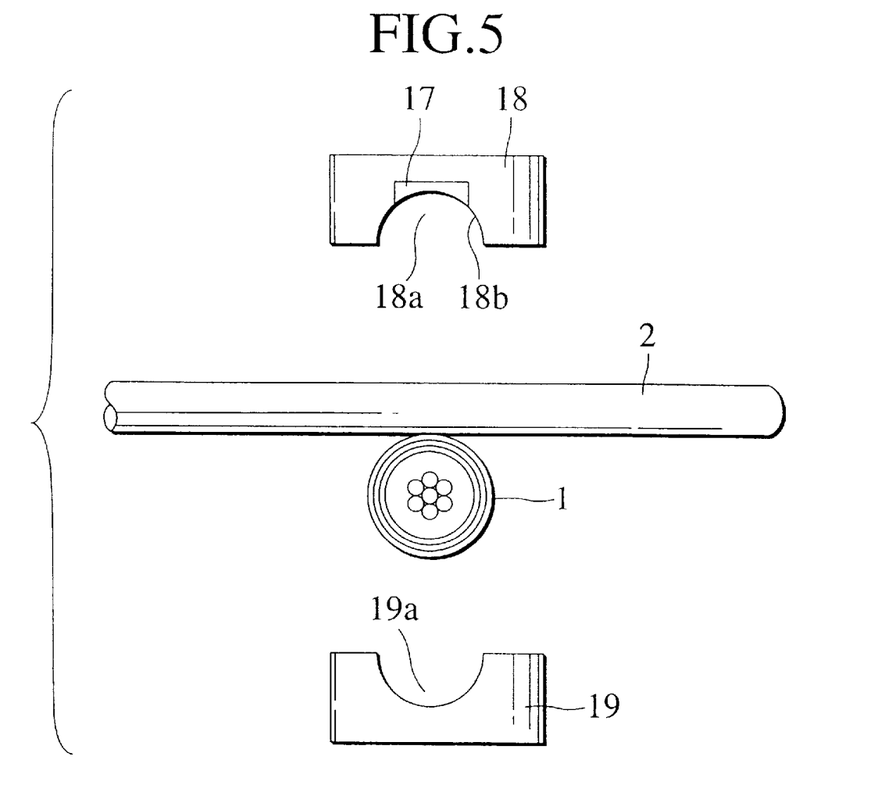
FIG. 5 is a side view showing a connecting method in accordance with a second embodiment of the present invention.
Figure 6:
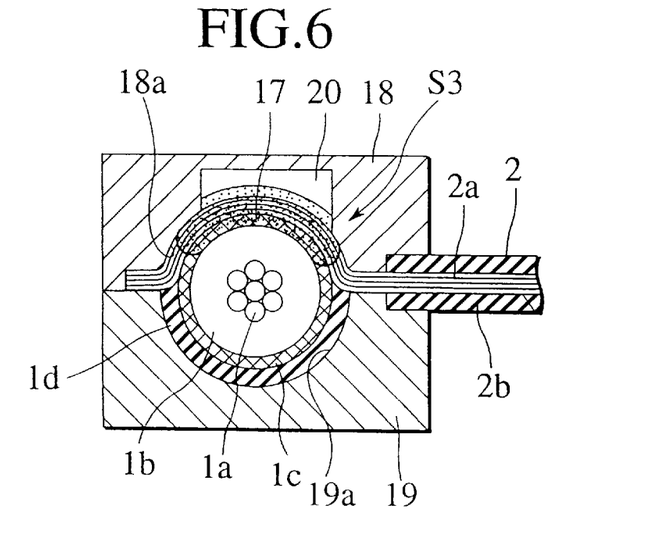
FIG. 6 is a cross sectional view showing the interior of a connecting structure of the second embodiment.

FIGS. 3A, 3B and 4 show an upper resin tip 18 performing the second embodiment of the invention. FIG. 5 shows a connecting method of the second embodiment, while FIG. 6 shows a connecting part S2 resulting from the adoption of the connecting structure of the embodiment. As shown in FIGS. 3A, 3B and 4, according to the embodiment, the upper resin tip 18 is provided, on an inner face 18b of a wire accommodating groove 18a thereof, with an accommodation recess 20 in which the low-melting welding material 17 is accommodated before the ultrasonic oscillation.

In order to connect the shield wire 1 with the ground wire 2, the latter is firstly overlaid on the former so as to cross each other at the connecting part S1. Next, both overlapping portions of the shield wire 1 and the ground wire 2 are interposed between the upper resin tip 18 and a lower resin tip 19. At this time, the low-melting welding material 17 is already accommodated in the accommodation recess 20 of the upper resin tip 18. In this state, while compressing the upper and lower resin tips 18, 19 from the outside, they are subjected to the ultrasonic oscillation by using the ultrasonic horn 7 and the anvil 8. Consequently, the outside rind 1d of the shield wire 1 and the outside rind 2b of the ground wire 2 are together molten and removed from the vicinity of the connecting part S2, so that the braided wire 1c of the shield wire 1 comes into electrical contact with the core line 2a of the ground wire 2. Simultaneously, the upper and lower resin tips 18, 19 are mutually welded to each other, for sealing up the surroundings of the connecting part S2.

Further, owing to the internal heating action generated between the resin tips 18, 19 by the ultrasonic oscillation, the low-melting welding material 17 is molten to flow among the stitches of the braided wire 1c and also among the core line 2a, so that the braided wire 1c is joined to the core line 2a through the material 17, metallically.

According to the embodiment, it is possible to ensure a relatively large amount of low-melting welding material 17 between the ground wire 2 and the upper resin tip 18. Therefore, it is also possible to make sure of the conductive area between the braided wire 1c and the core line 2a more widely, whereby the electrical performance can be improved, furthermore.

In the following table 2, there are shown an inter-connection resistance of the connecting part S2 after thermal-shock test, in both cases of providing the upper resin tip 18 with the accommodation recess 20 and with no recess.

From the table 2, it will be understood that a reduction of inter-connection resistance without the accommodation recess 20 is large in comparison with that of inter-connection resistance with the recess 20.

TABLE 2

| Inter-Connection Resistance after Thermal shock Test (mΩ) | | |
| --- | --- | --- |
| | Initial stage | After endurance test |
| No modification in tip profile | 1.06 | 12.72 |
| Recess in tip center | 0.41 | 8.52 |

Additionally, according to the embodiment, since the low-melting welding material 17 is accommodated in the recess 20, there is no possibility of the molten material's leak-out through a clearance between the resin tips 18, 19. Thus, the conventional insulating work to wind an insulating tape around the resin tips 18, 19 would become useless.

[3rd. Embodiment]

Figure 7A:
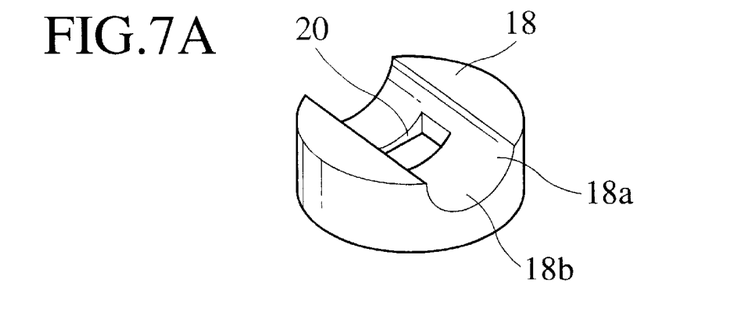
FIG. 7A is a perspective view of the upper resin tip provided with an accommodation recess and FIG. 7B is a perspective view showing a condition that the low-melting brazing material is accommodated in the accommodation recess so as to project from an inner face of the tip.
Figure 7B:
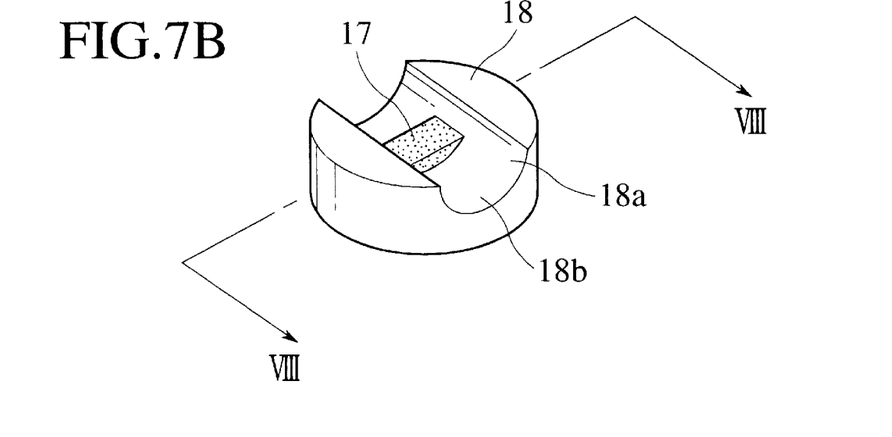
Figure 8:
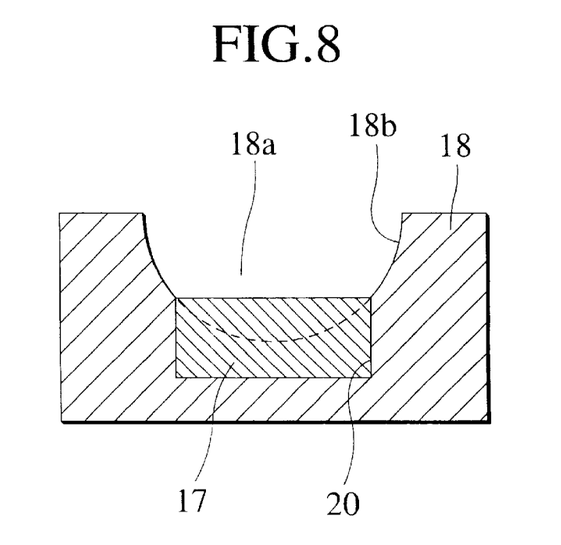
FIG. 8 is a cross sectional view taken along a line VIII—VIII of FIG. 7B, showing the interior of a connecting structure of the third embodiment.
Figure 9:
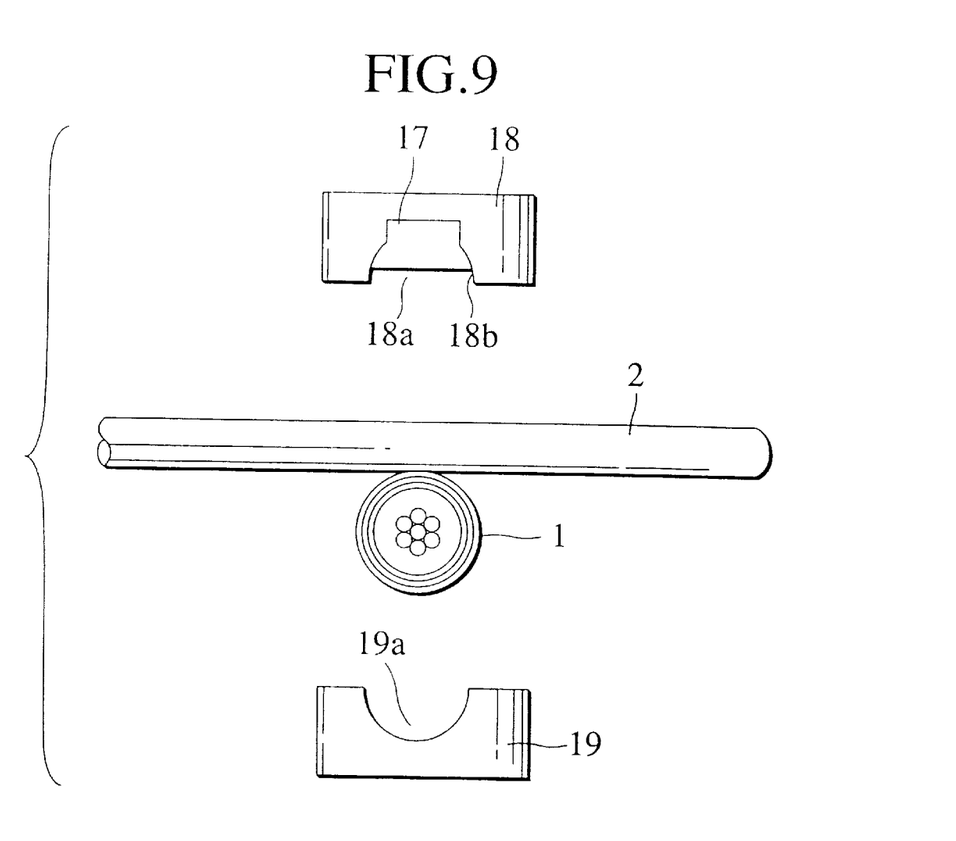
FIG. 9 is a side view showing the connecting method in accordance with the third embodiment of the present invention.
Figure 10:
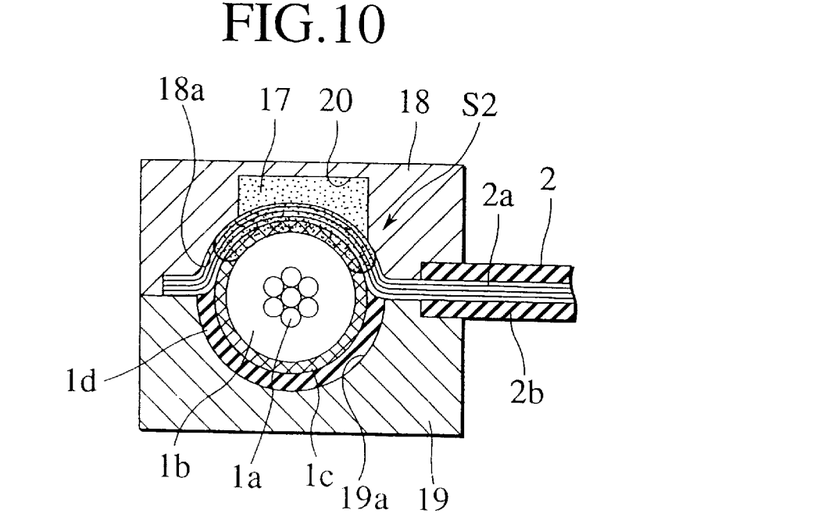
FIG. 10 is a cross sectional view showing the interior of the connecting structure of the third embodiment.

FIGS. 7A, 7B and 8 show the upper resin tip 18 performing the third embodiment of the invention. FIG. 9 shows a connecting method of the third embodiment, while FIG. 10 shows a connecting part S3 resulting from the adoption of the connecting structure of the embodiment. As shown in FIGS. 7A, 7B and 8, according to the embodiment, the upper resin tip 18 is provided, on the inner face 18b of the wire accommodating groove 18a, with the accommodation recess 20 for accommodating the low-melting welding material 17 before the ultrasonic oscillation, as well as the second embodiment. The difference between the third embodiment and the second embodiment resides in that the material 17 of the embodiment is accommodated in the recess 20 in a manner that a top of the material 17 somewhat projects from the inner face 18b of the groove 18.

According to the embodiment, in comparison with the second embodiment, it is possible to ensure a relatively large amount of low-melting welding material 17 between the ground wire 2 and the upper resin tip 18. Therefore, it is also possible to make sure of the conductive area between the braided wire 1c and the core line 2a more widely, whereby the electrical performance can be improved, furthermore.

In the following table 3, there are shown an inter-connection resistance of the connecting part S3 after thermal-shock test, in both cases of projecting the material 17 from the inner face 18b and leveling the material 17 with the inner face 18b.

From the table 3, it will be understood that a reduction of inter-connection resistance when leveling the material 17 with the inner face 18b is larger than that of inter-connection resistance when projecting the material 17 from the inner face 18b.

TABLE 3

| Inter-Connection Resistance after Thermal shock Test (mΩ) | | |
| --- | --- | --- |
| | Initial stage | After endurance test |
| Same level with tip | 0.41 | 8.52 |
| Level higher than tip | 0.42 | 4.90 |

Finally, it will be understood by those skilled in the art that the foregoing description is related to preferred embodiments of the disclosed connecting structure and method, and that various changes and modifications may be made to the present invention without departing from the spirit and scope thereof.

What is claimed is:

1. A connecting structure for covered wires, comprising:
    a first covered wire having a first conductor covered with an insulating cover;
    a second covered wire having a second conductor covered with another insulating covered wire, the second cover being overlaid on the first covered wire so as to cross thereto;
    upper and lower resin tips welded to each other so as to interpose overlapping portions of the first and second wires therebetween; and
    a welding material being positioned at least either between the overlapping portions of the first and second covered wires or between the upper resin tip and the second covered wire;
    wherein the insulating covers of the first and second wires are locally removed at the overlapping portions of the first and second wires so that the first conductor of the first covered wire comes into electrical contact with the second conductor of the second covered wire, thereby providing a connecting part of the first and second wires; and
    wherein the welding material is molten into the connecting part, while the upper and lower resin tips welded to each other seal up the circumference of the connecting part.

2. A connecting structure as claimed in claim 1, wherein the upper and lower resin tips are provided, on their faces butting each other, with wire accommodating grooves of semi-circular cross sections, each of which has a diameter substantially equal to the diameter of the first covered wire.

3. A connecting structure as claimed in claim 2, wherein the first covered wire is a shield wire having a shield conductor as the first conductor, while the second covered wire is a ground wire having a core line as the second conductor.

4. A connecting structure as claimed in claim 2, wherein the wire accommodation groove of the upper resin tip is provided with a recess for accommodating the welding material therein.

5. A connecting structure as claimed in claim 4, wherein the welding material is arranged in the recess so that a top of the welding material projects from an inner face defining the wire accommodation groove of the upper resin tip.

6. A method of connecting covered wires to each other, the method comprising the steps of:
    preparing a first covered wire having a first conductor covered with an insulating cover and a second covered wire having a second conductor covered with another insulating cover;

overlaying the second covered wire on the first covered wire so as to cross each other;

putting overlapping portions of the first and second wires between an upper resin tip and a lower resin tip; and oscillating the upper and lower resin tips with ultrasonic waves while pressurizing the upper and lower resin tips from the outside, whereby the insulating covers of the first and second covered wires are locally molten and removed in the vicinity of the overlapping portions thereby to allow the first conductor of the first covered wire to contact with the second conductor of the second covered wire, and whereby the upper and lower resin tips are mutually welded into one body thereby to seal up the circumference of the contact between the first conductor and the second conductor with the resin tips that are mutually welded into one body;

wherein, before oscillating the upper and lower resin tips with ultrasonic waves, a welding material is interposed at least either between the overlapping portions of the first and second covered wires or between the upper resin tip and the second covered wire.

7. A method of connecting as claimed in claim 6, wherein the upper and lower resin tips are provided, on their faces butting each other, with wire accommodating grooves of semi-circular cross sections, each of which has a diameter substantially equal to the diameter of the first covered wire, and the wire accommodation groove of the upper resin tip is provided with a recess for accommodating the welding material therein; and wherein the overlapping portions of the first and second covered wires are put between the upper resin tip and the lower resin tip on condition that the welding material is accommodated in the recess in advance.

8. A method of connecting as claimed in claim 7, wherein the welding material is arranged in the recess so that a top of the welding material projects from an inner face defining the wire accommodation groove of the upper resin tip.

* * * * *

UNITED STATES PATENT AND TRADEMARK OFFICE
CERTIFICATE OF CORRECTION

PATENT NO.    : 6,291,771 B1  
DATED         : September 18, 2001  
INVENTOR(S)   : Satoshi Tanikawa and Nobuyuki Asakura Page 1 of 1

It is certified that error appears in the above-identified patent and that said Letters Patent is hereby corrected as shown below:

<u>Title page,</u>  
Item [57], ABSTRACT,  
Line 8, "2d" should read -- 2b --.  
Line 8, "1,2" should read -- 1, 2 --.

<u>Column 8,</u>  
Line 23, "covered wire, the second cover" should read -- cover, the second covered wire --.

Signed and Sealed this

Thirtieth Day of July, 2002

Attest:

JAMES E. ROGAN  
*Attesting Officer*     *Director of the United States Patent and Trademark Office*

UNITED STATES PATENT AND TRADEMARK OFFICE
CERTIFICATE OF CORRECTION

PATENT NO. : 6,291,771 B1
DATED : September 18, 2001
INVENTOR(S) : Satoshi Tanikawa and Nobuyuki Asakura It is certified that error appears in the above-identified patent and that said Letters Patent is hereby corrected as shown below:

<u>Title page,</u>
Item [57], ABSTRACT,
Line 8, "2d" should read -- 2b --.
Line 8, "1,2" should read -- 1, 2 --.

<u>Column 8,</u>
Line 23, "covered wire, the second cover" should read -- cover, the second covered wire --.

Signed and Sealed this

Fourteenth Day of January, 2003

JAMES E. ROGAN
*Director of the United States Patent and Trademark Office*